J. E. COWEL.
MOUSETRAP PEDAL.
APPLICATION FILED NOV. 18, 1919.

1,345,137.

Patented June 29, 1920.

Inventor
J. E. Cowel

Witnesses

By Victor J. Evans
Attorney

UNITED STATES PATENT OFFICE.

JOHN ELLIOTT COWEL, OF CREST, COLORADO.

MOUSETRAP-PEDAL.

1,345,137.     Specification of Letters Patent.     Patented June 29, 1920.

Application filed November 18, 1919. Serial No. 338,786.

*To all whom it may concern:*

Be it known that I, JOHN E. COWEL, a citizen of the United States, residing at Crest, in the county of Weld and State of Colorado, have invented new and useful Improvements in Mousetrap-Pedals, of which the following is a specification.

This invention relates to mouse and rat traps, particularly to that type employing a rectangular spring member held in lowered or horizontal position by a wire engaging beneath the treadle member which is ordinarily formed of wood and provided with a hole for the reception of bait, and the object of the present invention is the provision of a pedal or treadle member adapted for use in this type of trap and formed entirely of metal, and hollow, whereby to contain a considerable quantity of bait which will be inaccessible to other animals even after the trap has been sprung upon one, the trap being consequently capable of prolonged use without frequent rebaiting.

An important object is the provision of a device of this character which is formed from a single piece of flexible material cut and bent to shape whereby the device will be extremely simple and inexpensive.

With the above and other objects and advantages in view, the invention consists in the details of construction to be hereinafter more fully described and claimed, and illustrated in the accompanying drawing in which—

Figure 1:
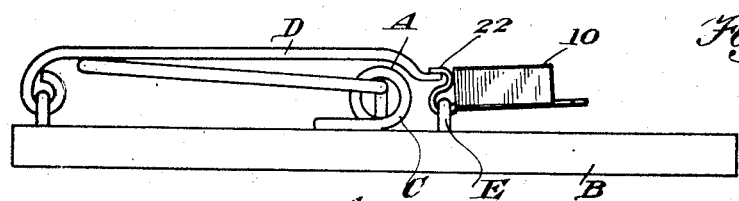
Figure 1 is a side elevation of a trap employing my invention.
Figure 2:
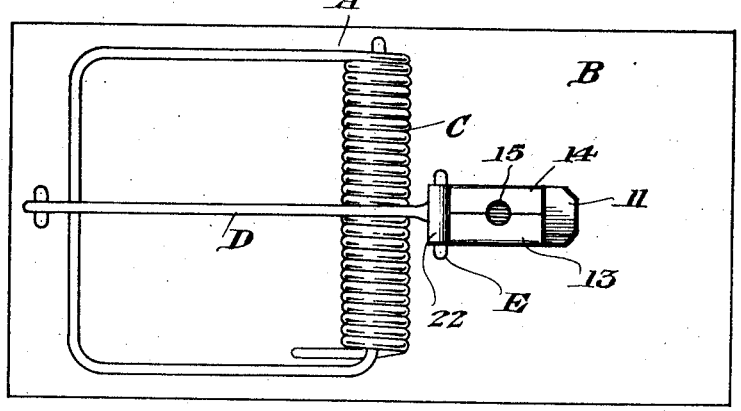
Fig. 2 is a plan view thereof.
Figure 3:
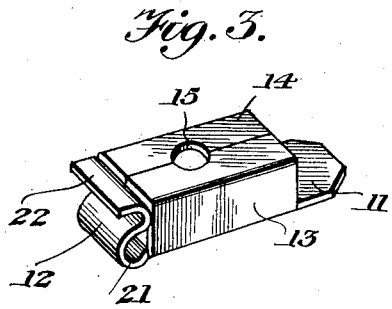
Fig. 3 is a perspective view of my treadle member.
Figure 4:
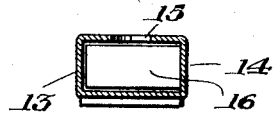
Fig. 4 is a cross sectional view therethrough.
Figure 5:
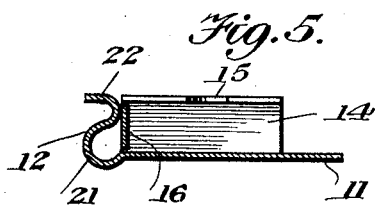
Fig. 5 is a longitudinal sectional view.
Figure 6:
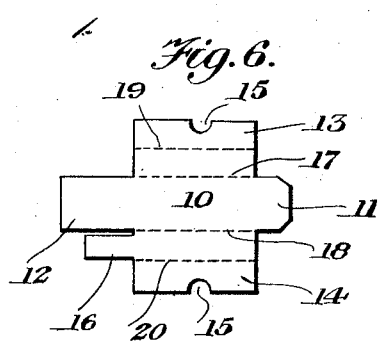
Fig. 6 is a view of the blank from which it is formed.

Referring more particularly to the drawing, the letter A designates a trap of the type which includes a base B upon which is mounted a spring member C of rectangular form held in set position by a wire D which has one end connected with the base B and its other end engageable beneath a treadle member.

The subject matter of my invention is the treadle member which is formed from a single piece of material, such as tin or sheet iron which is cut to provide a body portion 10, tongues 11 and 12 at opposite ends thereof, portions 13 and 14 at the opposite sides thereof with the outer edges of the portions 13 and 14 cut away, as shown at 15, and further including a relatively small tongue 16 formed on either the portion 13 or 14 at one end thereof.

In the formation of my treadle member from the blank, the portions 13 and 14 are bent upwardly upon the lines 17 and 18 and are then rebent upon the lines 19 and 20, whereby to form a hollow rectangular body. The tongue 16 is then bent to extend across one open end of the body above the tongue 12, after which the tongue 12 is bent upwardly, as shown at 21, and then has its terminal portion bent outwardly to provide the lip 22 which is engaged by the setting wire D. The bend 21 provides for pivotal mounting of the treadle upon the staple E commonly provided for the purpose in traps of this character. When the device is thus formed, it will be seen that the cut out portions 15 at the edges of the portions 13 and 14 will be disposed opposite each other so as to define a circular opening through which bait inserted within the hollow body of the treadle may be visible.

In the use of the device the bait, which may be a piece of cheese or the like, is placed within the hollow body, after which the tongue 11 is bent upwardly to form a closure for the outer end of the body, the bent tongue 16 forming a closure for the other end, as will be readily understood. It will be obvious that the bait will be exposed temptingly while it is inaccessible so that even after the trap is sprung the mice or rats cannot gain access to and remove or devour the bait. It will therefore be apparent that the device may be used for catching many rats or mice without any necessity for rebaiting.

From the foregoing description and a study of the drawing it will be apparent that I have thus provided an extremely efficient bait holding treadle which will be highly convenient and labor saving in use and which will very efficiently perform all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In a trap including a base, a spring arm mounted on said base and a setting member adapted to hold said spring under tension; a releasing treadle for the spring comprising a hollow body pivotally mounted upon the base and having one end formed with a tongue bent and rebent to define a lip for engagement of said setting wire, the end of said body adjacent said tongue being closed and the other end being normally open whereby to permit the insertion of bait, said second named end being formed with a tongue bendable over the end whereby to form a closure therefor.

2. In a trap including a base, a spring arm mounted on said base, and a setting member adapted to hold said spring under tension, a releasing treadle for the spring comprising a hollow body formed from a single piece of sheet metal including a body portion, tongues at the ends thereof, side portions having their edges cut away, and a tongue at the end of one side portion, said side portions being bent upwardly and then toward each other whereby to bring said cut-away portions into opposition for defining an opening and whereby to define a hollow body, said last named tongue being bent to extend across one end of said hollow body, one of said first named tongues being bent upwardly and then outwardly to define a setting wire engaging lip, said hollow body being adapted to contain bait exposed through said opening, and the other of said first named tongues being bendable upwardly to form a closure for the other end of the hollow body.

In testimony whereof I affix my signature.

JOHN ELLIOTT COWEL.